United States Patent

[11] 3,624,626

[72] Inventor William T. MacCreadie
R. D. No. 2 408 21st St., Lewisburg, Pa. 17837
[21] Appl. No. 69,750
[22] Filed Sept. 4, 1970
[45] Patented Nov. 30, 1971
Original application Feb. 20, 1967, Ser. No. 617,111, now Patent No. 3,544,989, Continuation-in-part of application Ser. No. 585,961, Oct. 11, 1966, now abandoned. Divided and this application Sept. 4, 1970, Ser. No. 69,750

[54] SEQUENCE RESPONSIVE RELAY MATRIX
14 Claims, 3 Drawing Figs.
[52] U.S. Cl. .................................................... 340/223, 340/168, 340/415
[51] Int. Cl. ...................................................... G08b 21/00
[50] Field of Search............................................ 340/147, 147 LP, 166, 168, 323, 415, 223

[56] References Cited
UNITED STATES PATENTS
2,206,827  7/1940  Prince, Jr. ..................... 340/223
3,434,712  3/1969  Matsumura et al. ........... 340/323 X
3,524,185  8/1970  Ehni............................. 340/415

Primary Examiner—Donald J. Yusko
Attorney—Jones and Lockwood

ABSTRACT: A relay matrix for monitoring electrical signals and for determining and registering the sequential order in which they arrive.
The relays have multicontacts which are wired to lock out all but one register relay per row and column.

SEQUENCE RESPONSIVE RELAY MATRIX

This application is a division of my application Ser. No. 617,111, filed Feb. 20, 1967, now U.S. Pat. No 3,544,989, which is a continuation of my application Ser. No. 585,961, filed Oct. 11, 1966, now abandoned.

BACKGROUND OF THE INVENTION

The present invention relates to a system for monitoring electrical pulses or signals which arrive in random order and for preserving the sequence in which they arrive, and more particularly to a relay matrix having a plurality of input channels for receiving corresponding signals and a plurality of output channels which are energized in accordance with the sequence of arrival of the signals.

Detectors for electrical pulses or signals are, of course, in general use, and there have been attempts in the past to provide indicators for recording the order or sequence of a plurality of random signals. However, such attempts have generally resulted in extremely complex circuits which, partly as a result of this complexity, have been relatively unreliable in addition to being expensive to construct and maintain. In addition, many such detectors merely record the presence or absence of a signal, and are incapable of registering a sequence of occurrence with a high degree of accuracy, particularly where two different pulses arrive at the detector almost simultaneously.

The difficulties inherent in prior art devices become most apparent in their application to electrical and electronic timing devices used, for example, to determine the winner of a race in a sporting event. Contests in a variety of sports are conducted with a number of participants, many or all of whom might arrive at the finish line within small fractions of a second of each other. Although electronic timer mechanisms have been provided in the past, difficulty has been experienced in finding suitable detector circuitry for separating the signals and producing an accurate and reliable indication of the order in which the contestants finish the race. The accurate judging and timing of individual contestants presents many problems, as is well known in the art, and numerous attempts have been made to automate this operation so as to avoid the human error that arises when races are manually timed. However, no machine has yet been devised which can provide results that are sufficiently satisfactory to displace the virtually universal use of hand-held stop watches.

One of the major problems involved in timing contests such as swimming races is the inability to provide a signalling mechanism which will respond to the finish of the race; however, an apparatus which overcomes the disability of the prior art in this regard has been disclosed and is claimed in my above-identified copending application. This apparatus is safe, easy to install and maintain, yet provides extremely accurate and reliable signals when touched by a contestant who is finishing his race. As also set forth in the referenced copending application, the problem that arises lies in the ability to record and provide an indication of the exact order in which the contestants reach a finish line, and to this end the relay matrix of the present application was devised.

SUMMARY OF THE INVENTION

It is, therefore, one of the objects of the present invention to provide a relatively simple and inexpensive detector for monitoring electrical signals and for preserving the order in which such signals reach the detector.

Another object of the invention is to provide a relay matrix system which is responsive to discrete signals arriving sequentially on corresponding channels, and for providing an output signal representative of the order in which each such signal is received.

Briefly, the present invention is a relay matrix system by which a series of electrical signals are detected and recorded so as to preserve the sequential order in which they arrive at the relay matrix. This is accomplished through a relay system comprising a plurality of electromagnetic relays arranged in a plurality of rows and columns and interconnected to form a matrix. Each column of relays corresponds to an input channel on which incoming signals appear in random order. An additional column of sequencing relays is provided, these relays serving to permit activation of each row of relays in sequence and to prevent a given row from responding to two different signals. The rows in the matrix correspond to the order of arrival of the pulses, the first row corresponding to and responding to the first arriving signal, the second row corresponding to and responding to the second arriving signal, and so on, each row responding to its designated signal, no matter on which column that signal arrives.

An indicator lamp is associated with each of the matrix relays except the sequencing relays, so that when a relay in a given row and column is energized by an incoming electrical signal, a corresponding lamp is energized. The first electrical signal in a sequence which is applied to the matrix energizes a relay in the corresponding column, in the first row, thereby producing an indication and at the same time energizing the first sequencing relay to direct subsequent signals to succeeding rows. The next incoming signal, which is the second in the sequence, when applied to the matrix in its corresponding input channel will, therefore, energize a relay in the second row, illuminating a corresponding lamp which will provide an indication that the second signal in the sequence was in that channel. In similar manner, subsequent signals in the sequence energize relays in the remaining rows.

Brief Description of the Drawings

The novel features of the invention are set forth with particularity in the appended claims, but the invention will be understood more clearly and fully from the detailed description of a preferred embodiment of the invention as set forth in the accompanying drawings, wherein like reference numerals designate like parts, and in which:

DESCRIPTION OF A PREFERRED EMBODIMENT

Figure 1:
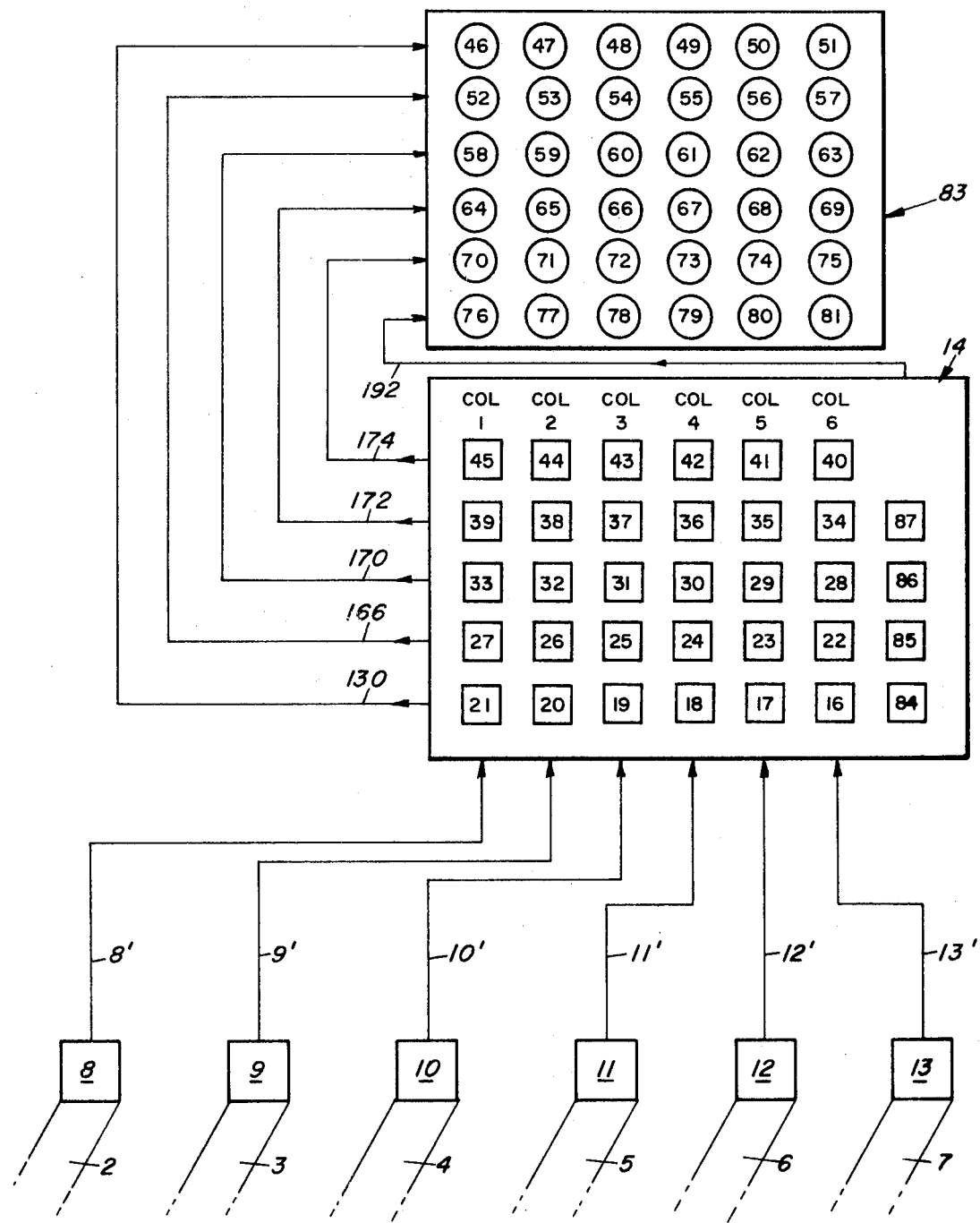
FIG. 1 is a diagrammatic representation of an apparatus embodying the teachings of the invention as associated with a six-lane swimming pool.

Although applicable to any series of pulses appearing on separate input lines, or channels, in a random sequence which are to be sorted in the order of reception, the present invention will be described in conjunction with a swimming race judging system in order to illustrate both a practical application of the invention and its mode of operation. Accordingly, there is illustrated in diagrammatic form in FIG. 1 six racing lanes 2,3,4,5,6 and 7 in a conventional swimming pool, which lanes represent the paths to be followed by the contestants in a race. At the finish line of each lane there is located a corresponding mechanism, indicated at 8–13, respectively, which may be activated by a swimmer to produce an electrical signal upon completion the race. The apparatus for producing this electrical signal is described in detail in my copending application Ser. No. 617,111, entitled "Judging System for Competitive Swimming Activities." As described in that application, the system includes not only means for responding to the finish of the race, but a mechanism for generating an electric signal in each lane when the individual racer leaves the starting platform at the start of the race, whereby the elapsed time of each individual contestant may also be recorded. The system includes means for sorting out false starts, as when one of the participants in a race starts before the sound of the starter's gun. The starting mechanism includes a starting station on which the competitor stands before the start of the race and on which the next swimmer in a relay race stands during the race. This starting station includes suitable pressure contacts which are held closed by the weight of the competitor and which hold a suitable sensing relay in a state of energization. As soon as the competitor removes his weight from the starting box, this relay is deenergized to close a circuit which leads to a warning circuit and to a control circuit. If nothing has happened to disable the warning circuit, this will result in an alarm, which alarm will indicate a false start at the beginning of a race or will indicate during a relay race that a competitor has left the starting station before his teammate has reached the end of the pool. The warning circuit is disabled by the starting signal which indicates the start of the race and which may be generated by means of a sound-responsive relay activated by the firing of the starter's gun. This starting signal may also be used to energize a suitable elapsed time timer mechanism.

At the end of the swimming lanes which serves as the finish line, a touch mat is provided for each lane, the mat being made up of a plurality of rows of pressure sensing elements interconnected to produce a complete series circuit through the elements. When any one of the elements is touched, the circuit is broken, producing an output signal which is applied to a suitable control circuit for terminating the operation of the corresponding timer mechanism. By utilizing a break circuit for the touch pad, it is easy to determine before the race starts whether all of the elements are operable to produce the desired signal. The output signal applied to the control circuit produces a finish signal which indicates that the swimmer in the corresponding lane has completed the race. This finish signal not only disables the timer for the corresponding lane, but is applied to the relay matrix for determination and subsequent indication of the order of finish of the contestants.

The finish signals from the control circuits for each lane are applied by way of lines 8'—13' to corresponding input channels of the diagrammatically illustrated relay matrix 14. It will be understood, however, that the signal appearing in the input channel 8'—13' may be derived from any desired source, and are not necessarily limited to the output signals derived from the judging system of the above-identified copending application. For purposes of illustration, the relay matrix is illustrated as including six columns and five rows of relays, the individual relays being diagrammatically illustrated at 16–45 in FIG. 1. As will be explained in more detail hereinbelow, the relay matrix receives the signals from a suitable source and produces a corresponding output for each input signal, the row of relays which provides the output signal corresponding to the order in which the input signals are received. Each relay in matrix 14 is connected by way of an output line to an indicator lamp, corresponding indicator lamps being illustrated at 46—81 in the indicator lamp bank 83. The indicator lamps are indicated in rows and columns in accordance with the relay matrix so that when a lamp lights in one of the columns of the first row, this is indicative of the input channel on which the first signal in the input sequence was received. Similarly, the second signal received by the relay matrix will be indicated by an illuminated lamp in the second row, and so on. Thus, when the system is used to register the order of finish in a race, the relay matrix will automatically select the winner, second place, third place and so on in the race, and will provide an indication of that order of finish on the indicator lamp bank 83, as explained in detail in the above-identified copending application Ser. No. 617,111.

Figure 2A:
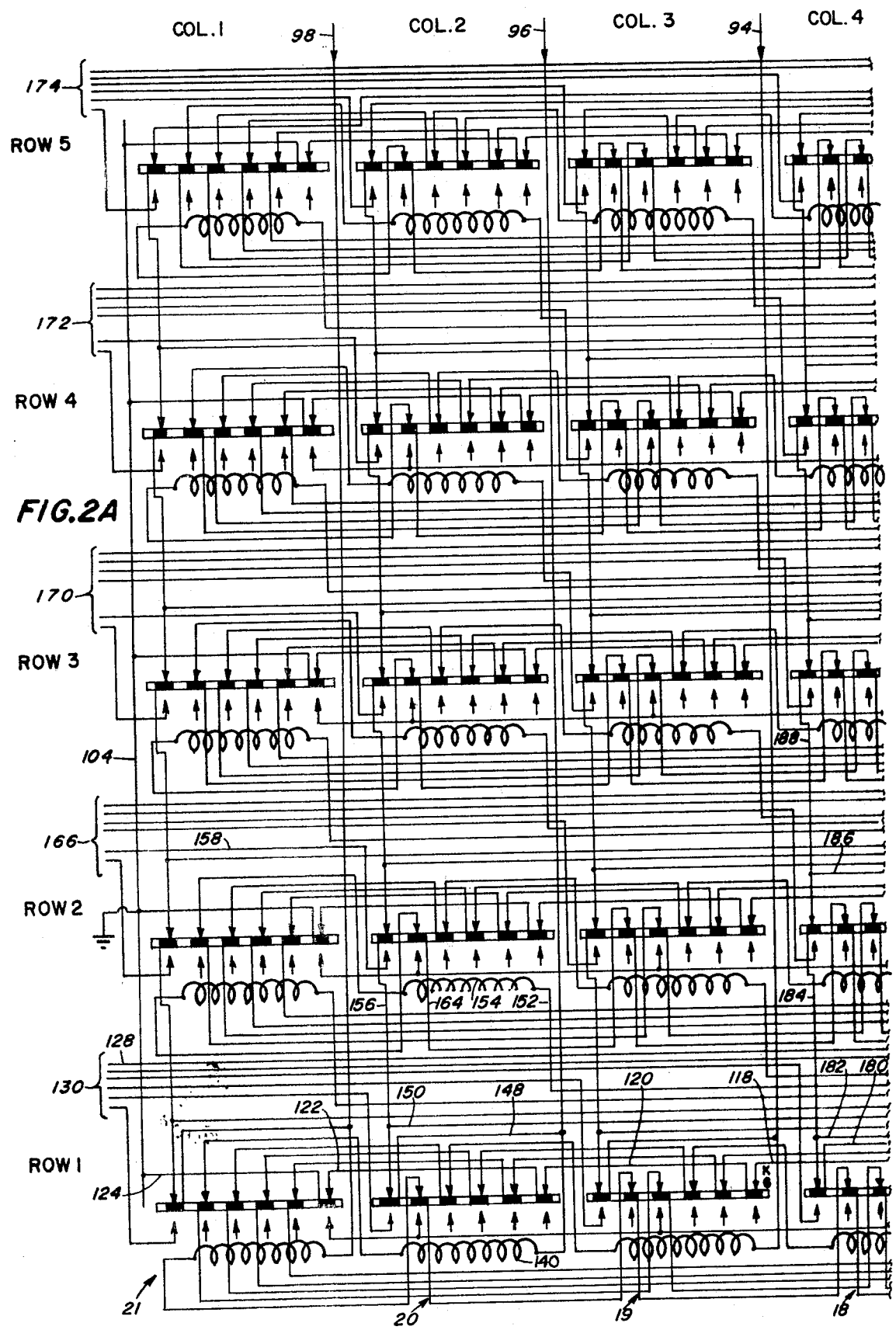
FIGS. 2A and 2B are a schematic representation of a relay matrix in accordance with the present invention.
Figure 2B:
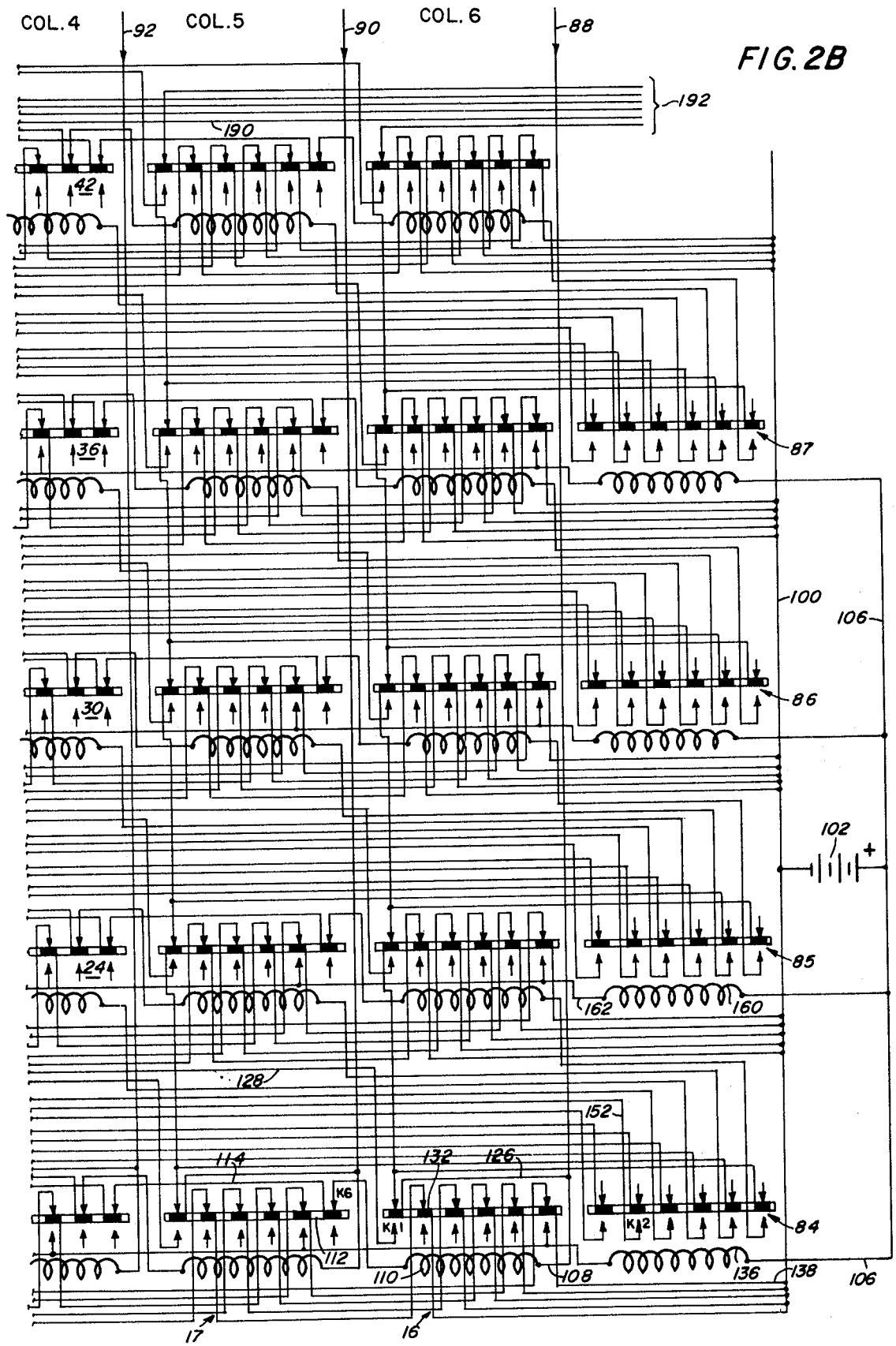

A preferred embodiment of the relay matrix 14 is shown in detail in the schematic diagram of FIG. 2, which illustrates the interconnection of relays 16—45, which relays operate the indicator lamps 46—75 of the lamp matrix 83 of FIG. 1. The remaining lamps 76—81 do not require corresponding relays in this embodiment, but serve to indicate the channel in which the last signal is received in response to the signal itself. In addition to the main relays, the matrix includes sequencing relays 84—87 which correspond to the first four rows of the illustrated five-row matrix, and which respond to the energization of any relay in their horizontal rows to shift the succeeding received signal from the bottom row to the next row up and the third energization to the row above that, and so on. Thus, in effect, each sequencing relay is connected between two horizontal rows, and shifts incoming signals from one to the other. Each relay is preferably a six-pole, double-throw relay, the contacts of which are illustrated in FIG. 2 by arrows. In this FIG. each contact is illustrated in its deenergized condition, with the movable armature being in its uppermost, or normal, position. The following chart identifies relays in the relay matrix of FIG. 2.

| 45 | 44 | 43 | 42 | 41 | 40 | |
|----|----|----|----|----|----|----|
| 39 | 38 | 37 | 36 | 35 | 34 | 87 |
| 33 | 32 | 31 | 30 | 29 | 28 | 86 |
| 27 | 26 | 25 | 24 | 23 | 22 | 85 |
| 21 | 20 | 19 | 18 | 17 | 16 | 84 |

One of the relays 16, 17, 18, 19, 20 and 21 in the bottom row of relays serves to register the reception of the first of a series of sequentially arriving input signals; i.e., the receipt of the first signal must be indicated through one of these relays. The second input signal will be indicated through one of the relays in the second row from the bottom of the chart, namely, one of relays 22, 23, 24, 25, 26, 27; similarly, the third signal will be received by one of the relays 28–33, the forth signal will pass through one of relays 34–39, the fifth signal will be registered by one of relays 40–45, and the sixth signal will be directly registered on the indicator without energizing a relay. Thus, a sequence of six signals may be registered by a minimal number of relays, reducing the cost and increasing the reliability of the present relay system. It will apparent from what follow that the matrix can be expanded to handle any desired number of input signals and if desired, an additional row of relays may be provided to register the last-received signal.

The input channels to the relay matrix are represented by six lead-in wires 88, 90, 92, 94, 96 and 98, one for each column of relays, which are used to apply electrical signals to the relays in the corresponding columns of the relay matrix 14. Thus, for example, lead-in wire 88 receives one of the input electrical signals at the top of the relay matrix 14 and drops vertically past relays 40, 34, 28 and 22 and is connected to the energization coil of relay 16. In similar manner, input lines 90, 92, 94, 96 and 98 are connected to the energization coils of the bottom row relays 17–21, so that each input signal applied to the matrix first seeks to energize a relay in the first row, each signal energizing a subsequent row only when a relay is already open n in the preceding row.

The matrix includes a bias source which provides a ground terminal 100 connected to the negative terminal of a battery 102 of suitable voltage. A second ground line 104 is also provided and preferably is also connected to the negative battery terminal. The positive terminal of the battery 102 is connected to positive bias line 106. For purposes of reference, the six contacts on each relay may be identified as K1–K6, from left to right as viewed in FIG. 2. The contacts points identified by arrowheads are stationary, with the bar portion being movable in accordance with the state of energization of the relay. The bar portion includes alternate conductive and nonconductive portions, the conductive portions being adapted to receive wires and being aligned with the stationary contacts.

A current or signal applied to line 88 is fed to relay 16 at point 108, passes through the relay coil 110, and is fed to the upper connection of contact K6 on relay 17.

For purposes of explaining the structure and operation of the relay circuit, it will be assumed that the first signal to be applied to the matrix is received in line 88. This signal is fed to relay 16, where it is connected at junction 108 to the relay coil 110, the signal thereafter being passed to the upper connection of contact K6 on relay 17. Since relay 17 is unenergized, the contact bar, or armature, 112 is in the upper position illustrated in FIG. 2, so that contact K6 is connected by way of a conductive portion on the bar and through wire 114 to the upper connection of contact K6 on relay 18. Similarly, this contact is connected by way of wire 118 to contact K6 of relay 19, thence through wire 120 to contact K6 of relay 20 and wire 122 to the upper contact K6 of relay 21. This last contact is connected through its armature bar by way of wire 124 to the negative terminal line 104, thereby completing the path for the input signal applied to line 88. Since all of the relays at this time are deenergized, the resultant current flow through relay coil 110 will energize relay 16, thereby pulling its armature bar downwardly against the lower connections of contact points K1-K6. Energization of this relay closes the lower connection of contact K1 in relay 16, thereby causing the signal on line 88 to flow through line 126 to the lower connection of contact K1 and thence through line 128 to the corresponding lamp 46 on indicator 83, lamp 46 indicating that the signal received on line 88 was registered in the first row of the matrix and thus, was the first signal received by the relay matrix. In similar manner, the lower connection of contact K1 for each of the relays 17-21 also is connected to a corresponding one of lamps 47—51, whereby the application of the first signal to the matrix by way of lines 90, 92, 94, 96 or 98, when energizing the corresponding first row relay, will produce an indication on the corresponding column of the first row of indicator lamps. This is indicated in FIG. 1, where cable 130 leads from the lowermost row of the relay matrix 14 to the "first place" row of the indicator lamp array 83.

In order to prevent the second signal which is applied to the relay matrix from also energizing a relay in the lowermost row, one of the auxiliary relays must be energized. This is accomplished when the armature bar 132 of relay 16 is pulled down, for this completes a circuit from the positive side of battery 102 through line 106, through the energization coil 136 of auxiliary, or sequencing, relay 84 to energize that relay. The other end of coil 136 is connected by way of the lower connection of contact K6 of relay 16, through the pulled down armature bar of this relay, and thence by way of line 138 to the negative, or ground line 100. The energization of sequencing relay 84 opens the second row of relays to energization by a subsequent input signal on one of the remaining channels, as will be explained in tracing the flow of an arbitrarily selected second signal.

It will be noted that each of the relays 16—21 includes six contacts, five of which provide the ground connection for the remaining five relays in the row. Thus, contacts K2-K6 of relay 16 provide the ground paths for relays 21, 20, 19, 18 and 17, respectively; upon opening of these contacts, the current path to the ground connection for the remaining relays is removed, and they cannot be energized by subsequently received signals. This pattern is followed throughout the matrix, so that energization of any relay in a selected row will open the ground connections for the excitation coils of the remaining relays in that row, thereby precluding further relay operation in the selected row. As a further example of this operation, relay 18 provides the ground connections for relays 21, 20, 19, 17 and 16 on its contacts K2—K6, respectively. Finally, it will be noted that one of the lower connections on each relay is used to provide a ground connection for the energization coil of the corresponding row sequencing relay, whereby the energization of any one relay in the row will assure proper energization of that sequencing relay to shift succeeding signals to successive rows.

As has been described, the lower connection of contact K1 on each relay serves to energize the appropriate indicator lamp when the armature bar is pulled down. However, for those bars which remain up in a given row, the incoming signal on any channel will be applied by way of the upper connection of normally closed contact K1 in the appropriate column to a corresponding conductive portion on the armature bar of the sequencing relay, whereby after energization of the sequencing relay, the signal will be conducted to the succeeding row relay in the appropriate columns. For this purpose, the sequencing relay includes one set of contacts for each column in the matrix, with the normally closed contact K1 for each column being connected to a corresponding sequencing relay contact; thus, matrix relay contacts K1 may be referred to as the sequencing contacts of these relays. The lower connection for each sequencing relay contact is connected to the energizing coil of the relay in a corresponding column, but in the next succeeding row, so that when a succeeding signal is received in one of the columns, it if fed through the sequencing contacts to the next row in which no relay has been energized.

To further illustrate the structure and operation of the present invention, it may be assumed, for example, that the second signal arriving at the matrix is applied by way of line 96, which signal may represent a second place finish by the contestant in lane (FIG. 1). As as before, such a signal is applied by way of line 96 to the excitation coil 140 of relay 20 in the bottom row of relays. However, since relay 16 has already been energized, the groundpath for the coil of relay 20 is open, as will be seen by tracing the output line from this coil through the contacts of relay 21, relay 19, relay 18, relay 17 to relay 16. Thus, this signal can energize no relay in the first row. In addition to being applied to the coil 140, the signal is also applied by way of line 148 to contact K1 of relay 20 and thence through the upper connection of this contact and through line 150 to a corresponding contact K2 on sequencing relay 84. Since this sequencing relay has been energized by the prior closure of relay 16, its armature bar has been pulled down and the current on line 150 may then pass through the lower connection of contact K2 to line 152, thence back to the excitation coil 154 of relay 26, the relay in the second row of the column corresponding to input 96. A ground connection is provided for coil 154 through corresponding contacts on the second row of relays 27, 25, 24, 23 and 22, back to ground terminal 100. Thus, the signal appearing on line 96 will energize relay 26, pulling its armature downwardly. When this occurs, a path is opened from line 96 through line 148 and contact K1 of relay 20 through line 156 to the lower connection of contact K1 in relay 26, and thence through line 158 to the corresponding lamp 56 on indicator bank 83.

When relay 26 is energized, it opens the ground circuits to all the remaining coils in its corresponding row, while at the same time establishing the ground path for he energization coil 160 of the sequencing relay 85. This energization path may be traced from positive line 106 the through coil 160 and line 162 to contact K2 in now-energized relay 26, then through line 164 and corresponding contacts of relays 25, 24, 23 and 22 to ground terminal line 100.

Each of the relays 22—27 in the second row is connected in the manner described above for relay 26 to their corresponding input lines, and each will operate substantially in the manner described for relay 26 (except in the present example, where relay 22 cannot be energized because of the prior excitation of relay 16 in the same column). Energization of any one of these relays will provide a voltage on one of the output lines to the indicator bank, these lines being generally indicated by cable 166. With sequencing relay 85 closed, or energized, a subsequent signal applied to the matrix on one of the remaining lines, 90, 92, 94 or 98 will be shifted by sequencing relays 84 and 85 to the third row of relays and will there energize a relay in its corresponding column, as described above. Closure of a relay in the third row will then result in an output signal on cable 170 to operate a corresponding indicator lamp in indicator bank 83. Simultaneously, sequencing relay 86 will be energized thereby to direct the next succeeding input signal to a corresponding relay in row 4. The operation of a relay in this row will result in an output signal on one of the lines in cable 172, again resulting in illumination of a corresponding lamp in bank 83. Simultaneously, the sequencing relay 87 will close so that the next to last signal applied to the matrix will energize a relay in the fifth row and will produce an output signal on cable 174. Although not described in detail, it will be apparent that the relays in the various rows and columns are connected in accordance with the principles described, as illustrated in detail in FIG. 2.

Although a relay has been energized for each of the first five signals received by the matrix in order to record an provide an indication of the sequence in which these signals were received, no such relay is required of the last signal received, although an additional row may be provided, if desired, for this last signal may be fed to its corresponding lamp in the last row of the indicator lamp matrix. If, for example, it is assumed that the last place finisher in a race, or some other source produces the last signal in the sequence on line 92, it will be seen that this signal will be applied, as before, to the energization coil of the relay in the first row of the column corresponding to that signal; i.e., relay 18. Since a relay has already opened in that row, no ground path is available, and the input signal is applied by way of line 180 through contact K1 of relay 18 to line 182. This line leads to the upper connection of contact K4 in sequencing relay 84, and since this relay has been energized, the signal on line 182 will be applied to the energization coil of relay 24 in the second row of the corresponding column. However, a relay in the second flow has already been energized, and no ground path is available for relay 24. Since, then, the input signal cannot flow through line 182, it is fed from line 180 through contact K1 to line 184, which carries the signal to contact K1 of relay 24. The signal flows through this contact and is fed through line 186 to contact K4 of sequencing relay 85 for application to the relay coil in the third row of this column. Again, no signal path is available through relay 30, so the input signal instead flows by way of line 188 to contact K1 of relay 30. In similar manner, with sequencing relays 86, and 87 energized, the signal is passed through contacts K1 of relays 30, 36 and 42 and thence to line 190 which leads by way of cable 192 to the remaining row of lamps in the matrix. It will be apparent that if any of the relays in this column had been previously energized, the current path just described would be unavailable. Although it would appear that all input signals would tend to flow immediately and directly to the input lamps by way of cable 192, instead of energizing any relays that might be available in the matrix, this can be avoided by providing a proper impedance in the indicator, whereby the current will follow the path of least resistance to an available relay.

It will be seen from the foregoing that through the use of very high-speed latching relays, the matrix is capable of distinguishing between successive signals arriving in very close time sequence without registering a tie. For example, if the relays are set to respond in 0.001 second, signals separated by only 0.0001 second can be distinguished and registered on a suitable indicator, or simply stored in the relay matrix itself, the energized relays providing the indication of the sequence of arrival of the signals. When the system is used in conjunction, for example, with swimming races, the device is capable, with the response times indicated above, of detecting a difference of as little as 1/16 of an inch between successive finishing swimmers without registering a tie, thus providing a means for judging races much more accurately than was possible with prior devices. Thus, there has been shown and described a specific embodiment of a relay system for automatically monitoring electrical pulses and for registering the sequential order in which they are received. It will be apparent that various modifications may be made in the relay matrix as shown and described, for the system may be expanded or reduced to accommodate a greater or lesser number of input and indicating channels by appropriate changes in the circuit and by the use of relays having the appropriate number of contacts. Such variations and modifications will be apparent to those skilled in the art, without departing from the true spirit and scope of the invention as described in the following claims.

I claim:

1. A relay matrix for automatically registering the time sequence of a plurality of electrical signals, comprising:
   a. a plurality of relays electrically interconnected in rows and columns;
   b. means for applying each of said plurality of signals to a corresponding one of said columns to energize a relay in said corresponding column; and
   c. sequencing means responsive to energization of a relay for shifting succeeding signals to succeeding rows, whereby the row in which said relay is energized corresponds to the time sequence of said signals.

2. The relay matrix of claim 1, further including means for preventing activation of more than one relay in any row.

3. The relay matrix of claim 1, wherein said sequencing means comprises a sequencing relay electrically connected between each of said rows of relays, said matrix further including means for directing the first-received signal to energize the relay in the first row of its corresponding column, thereby to activate the sequencing relay electrically connected between the first and second rows to cause the next received signal to energize the relay in the second row of its corresponding column, thereby activating the selector relay connected between the second and third rows, and so on, until a single relay is energized in each row.

4. The relay matrix of claim 3, wherein said means for preventing activation of more than one relay in any row comprised circuit means interconnecting all the relays in each row whereby the energization of one relay in a row opens the energization circuit path to the remaining relays in said row.

5. The relay matrix of claim 4, wherein the number of columns equals the number of electrical signals to be detected, the number of rows is one less than the number of columns, and the number of sequencing relays is one less than the number of rows.

6. The relay matrix of claim 5, further including indicator means corresponding to each said electrical signal and to each position in the time sequence in which said signal can be received, said indicator means being responsive to the energization of corresponding relays to register the time sequence of all said electrical signals except the last-received signal, said indicator means being directly responsive to said last-received signal.

7. The relay matrix of claim 6, wherein said indicator means comprises a matrix of indicator lamps arranged in rows and columns, said lamps being electrically connected to corresponding relays in said relay matrix whereby corresponding lamps are activated upon energization of said relays.

8. The relay matrix of claim 7, wherein said sequencing means for shifting succeeding signals to succeeding rows includes normally closed contact means on each relay, the normally closed contacts of the relays in each column being connected in series to the indicator means corresponding to the last-received signal, whereby said last-received signal operates a corresponding indicator lamp without energizing a relay in said matrix.

9. The relay matrix of claim 1, wherein each of said relays comprises a two-position switch means having one set of contacts for each column of said relay matrix, and means responsive to receipt of an electrical signal to move said switch means from its normal first position to its energized second position, thereby to register receipt of said signal.

10. The relay matrix of claim 9, wherein each of said relays is an electromagnetic relay including an energizing coil responsive to said received electrical signal to move said switch means, the energizing coils for each relay having a current path through a normally closed contact of each remaining relay in its corresponding row, whereby the energization of any one relay in a row opens the current paths for the energizing coils of the remaining relays in said row to prevent energization of more than one relay in a row.

11. The relay matrix of claim 10, wherein each of said relays includes a normally open contact electrically connected to said sequencing means for energizing said sequencing means upon energization of a relay.

12. The relay matrix of claim 11, wherein said sequencing means comprises a plurality of relays each having an energizing coil, each sequencing relay corresponding to ones of said rows, the current path for energizing coil of each sequencing relay being connected to the said normally open contact of each relay in its corresponding row, whereby energization of any relay in a row closes its normally open contact to complete the current path for the energizing coil of the corresponding sequencing relay.

13. The relay matrix of claim 11, further including indicator means for registering the time sequence of said electrical signals, and wherein each of said relays includes a second normally open contact electrically connected to a corresponding indicator means, whereby energization of a selected relay results in closure of its second normally open contact to energize its corresponding indicator means.

14. The relay matrix of claim 12, wherein each said sequencing relay includes for each column of said matrix a normally open sequencing contact electrically connected in series between a normally closed sequencing contact of each relay in its corresponding row and the energization coil of the relay in the next succeeding row of the corresponding column; means for applying a received electrical signal to the sequencing contact of each relay in its column, whereby said received signal is applied to a corresponding normally open sequencing contact on each sequencing relay; and means responsive to the energization by a first electrical signal of a sequencing relay for closing all of its normally open sequencing contacts, whereby a subsequent electrical signal will be applied to the energizing coil of a relay in the next succeeding row.

* * * * *